(12) United States Patent
Liao

(10) Patent No.: US 7,393,477 B2
(45) Date of Patent: Jul. 1, 2008

(54) METHOD OF FABRICATING MICROLENS STRUCTURE

(75) Inventor: Ho-Sung Liao, Hsin-Chu (TW)

(73) Assignee: United Microelectronics Corp., Hsin-Chu (TW)

( * ) Notice: Subject to any disclaimer, the term of this patent is extended or adjusted under 35 U.S.C. 154(b) by 0 days.

(21) Appl. No.: 11/464,824

(22) Filed: Aug. 15, 2006

(65) Prior Publication Data

US 2008/0043336 A1  Feb. 21, 2008

(51) Int. Cl.
*G02B 3/00* (2006.01)
*G02B 27/10* (2006.01)

(52) U.S. Cl. .................. 264/1.32; 359/620; 359/626

(58) Field of Classification Search ............ 257/431, 257/432; 264/1.1, 1.32, 1.36, 1.7, 2.5; 359/619, 359/620, 626; 427/162, 282, 307, 585, 262
See application file for complete search history.

(56) References Cited

U.S. PATENT DOCUMENTS

2006/0097297 A1\* 5/2006 Lee ............................. 257/292
2008/0023734 A1\* 1/2008 Cho ............................ 257/290

\* cited by examiner

*Primary Examiner*—David N Spector
(74) *Attorney, Agent, or Firm*—Winston Hsu

(57) ABSTRACT

The present invention provides a method of fabricating a microlens, comprising providing a substrate with at least a dielectric layer thereon, forming a first thin film on the dielectric layer surface, etching the first thin film to form at least a micro bump, and forming a second thin film on the micro bump surface and dielectric layer surface, wherein the second thin film and the micro bump form the microlens. The present invention microlens can be applied in the environment with high temperature, and a passivation layer is not required for the present invention microlens.

21 Claims, 17 Drawing Sheets

METHOD OF FABRICATING MICROLENS STRUCTURE

BACKGROUND OF THE INVENTION

1. Field of the Invention

The present invention relates to a method of fabricating a microlens and a structure thereof, and more particularly, to a method of fabricating a microlens with an etching process and a structure thereof.

2. Description of the Prior Art

CMOS image sensors (CISs) and charge-coupled devices (CCDs) are optical circuit components that represent light signals as digital signals. CISs and CCDs are used in the prior art. These two components widely applied to many devices, including: scanners, video cameras, and digital still cameras. CCDs use is limited in the market due to price and the volume considerations. As a result, CISs enjoy greater popularity in the market.

The CIS is manufactured utilizing the prior art semiconductor manufacturing process. This process helps to decrease the cost and the component size. It is applied in digital products such as personal computer cameras such as Web cams and digital cameras. Currently, the CIS can be classified into two types: line type and plane type. The line type CIS is applied in scanners, and the plane type CIS is applied in digital cameras.

Please refer to FIG. 1 to FIG. 2. FIG. 1 to FIG. 2 shows the CIS manufacturing process according to the prior art. As shown in FIG. 1, a semiconductor substrate 2 includes a plurality of shallow trench isolations (STI) 4 and a plurality of photodiodes 6. Each photodiode 6 connects electrically to at least one MOS transistor (not shown) such as reset transistor, current source follower, and row selector. The STI 4 is an insulator between these two adjacent photodiodes 6 for preventing the photodiode 6 from shorting with other components.

An inter layer dielectric (ILD) layer 8 is formed on the semiconductor substrate 2 to cover the photodiodes 6 and the STIs 4, and then a metallization process is performed on the ILD layer 8 to form a multilevel interconnects layer 9. The multilevel interconnects layer 9 includes an inter metal dielectric (IMD) layer 11 for isolation, and a metal layer 10 and a metal layer 12 serving as circuit connections of Metal-Oxide-Semiconductor (MOS) transistors. The metal layer 10 and the metal layer 12 are formed above every STI 4 for preventing each photodiode 6 from covering. The incident light (not shown) is gathered into the photodiode 6 without cross talk caused from the scattering. Next, a planarized layer 13 is formed on the metal layer 12, and the planarized layer 13 may be a multi-layer structure, for example, a silicon oxide layer formed by high density plasma process, or a plasma enhanced tetra-ethyl-ortho-silicate (PETEOS) layer formed by plasma enhanced chemical vapor deposition (PECVD) process with TEOS. Then, a passivation layer 14 such as a silicon nitride layer is formed for avoiding mist, and to prevent other impurities from entering the component area.

Thereafter, a color filter array (CFA) 18, which is combined by R/G/B filter patterns, is formed on the passivation layer 14. A spacer layer 20 is formed on the color filter array 18. A resin layer (not shown), which has the photoactive compound, is formed on the color filter array 18. In the prior art, the light source of the exposure process is a 365 nm wavelength UV (I-line). In the current technology, the microlens manufacture of the CIS most often uses I-line as the light source of the exposure process. After the 365 nm wavelength UV exposure and development, a light sensitization block 22 is formed to line up an array.

Please refer to FIG. 2. After the light sensitization block 22 is formed, a reflow process is performed. For example, the CIS 50 is exposed to high temperature for 5-10 minuets, and during the high temperature exposure, the resin material of the light sensitization block 22 changes, specifically, the shape of the resin layer is transformed by the high temperature of the reflow process. The light sensitization block 22 is a square in FIG. 1, and then, it becomes a microlens 24, which is almost a semicircular arc. After the reflow process, a passivation layer 26 is finally formed over the microlens 24, and the CIS 50 is finished.

SUMMARY OF THE INVENTION

An object of the present invention is to provide a method of fabricating a microlens and a structure thereof, and more particularly, to a method of fabricating a microlens with etching process and a structure thereof in order to solve the limitations and problems of the prior art.

According to the claims, the present invention provides a method of fabricating a microlens, comprising providing a substrate with at least a dielectric layer thereon, forming a first thin film on the dielectric layer surface, etching the first thin film to form at least a micro bump, and forming a second thin film on the micro bump surface and dielectric layer surface, wherein the second thin film and the micro bump form the microlens.

According to the claims, the present invention provides another method of fabricating a microlens, comprising providing a substrate with at least a dielectric layer thereon, forming a first thin film on the dielectric layer surface, etching the first thin film to form a patterned first thin film, forming a spacer around the patterned first thin film, the patterned first thin film and the spacer together forming a micro bump, and forming a second thin film on the micro bump surface and dielectric layer surface, wherein the second thin film and the micro bump form the microlens.

According to the claims, the present invention further provides a microlens structure for a semiconductor device, comprising a substrate with at least a dielectric layer thereon, at least a micro bump positioned on the dielectric layer surface, and an optical film on the micro bump surface and dielectric layer surface, the micro bump and the optical film being the microlens.

Since in the present invention, the micro bump comprising inorganic dielectric materials are formed by using various etching processes first, and then becomes the microlens with the optical film comprising inorganic dielectric materials formed by the CVD process, compared with the prior art, the microlens of the present invention can be applied in the high temperature environment over 250° C. such as in laser reading and writing devices without fracture problems. No additional passivation layer is required in the present invention compared with the prior art, because the inorganic dielectric materials such as Si3N4 are hard enough, and are capable of guarding against alkaline metal ion and mist. Furthermore, when the microlens of the present invention is applied in the CIS or CCD, the R/G/B filter layers can be used as the optical films and formed over the micro bump, to replace the CFA over the photodiode in the prior art, and in this way, not only the cost is reduced but also the distance between the microlens and the photodiode is minimized, thereby minimizing the problems caused by oblique light beams.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
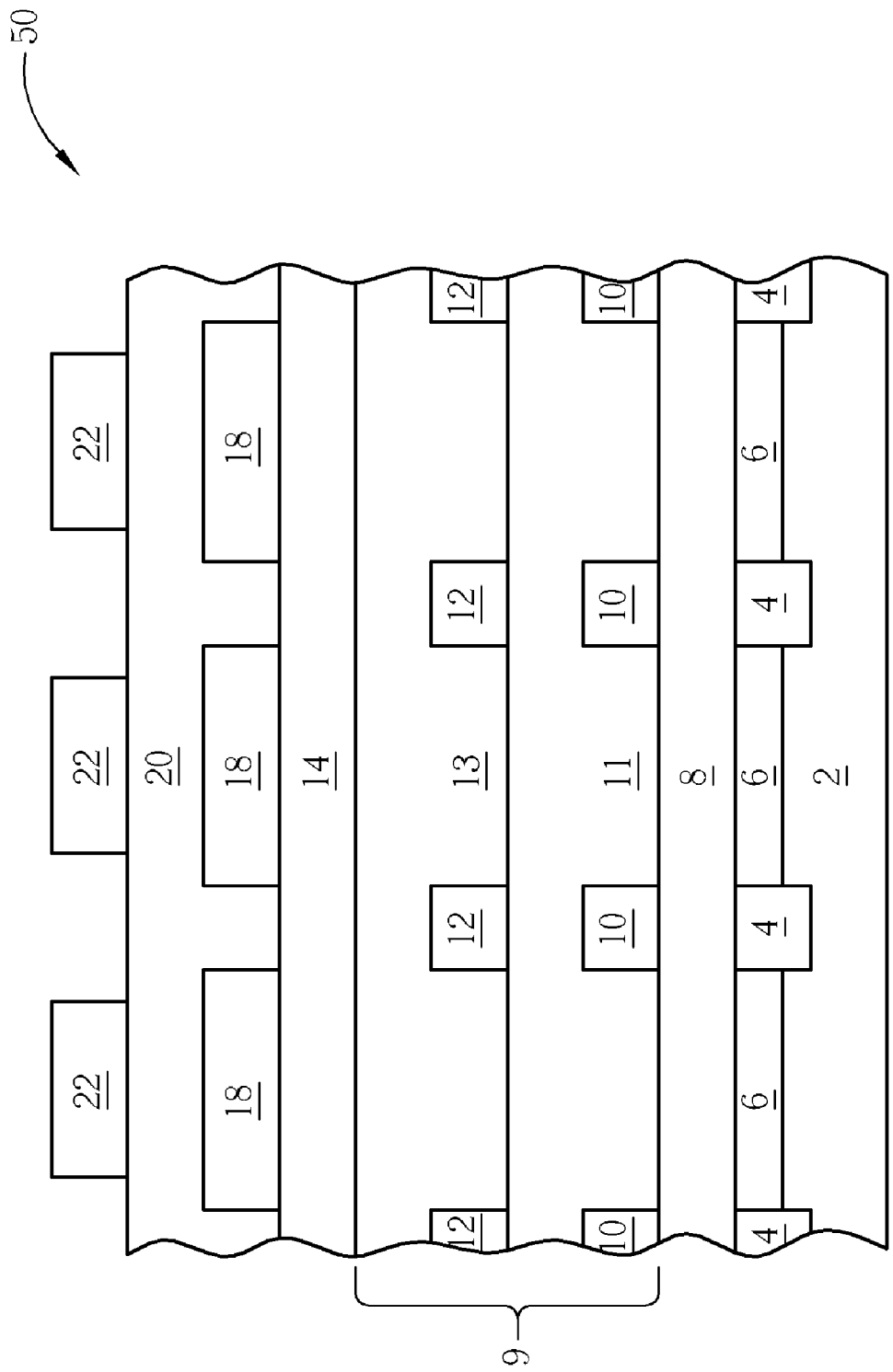
FIG. 1 to FIG. 2 shows the CIS manufacturing process according to the prior art.
Figure 2:
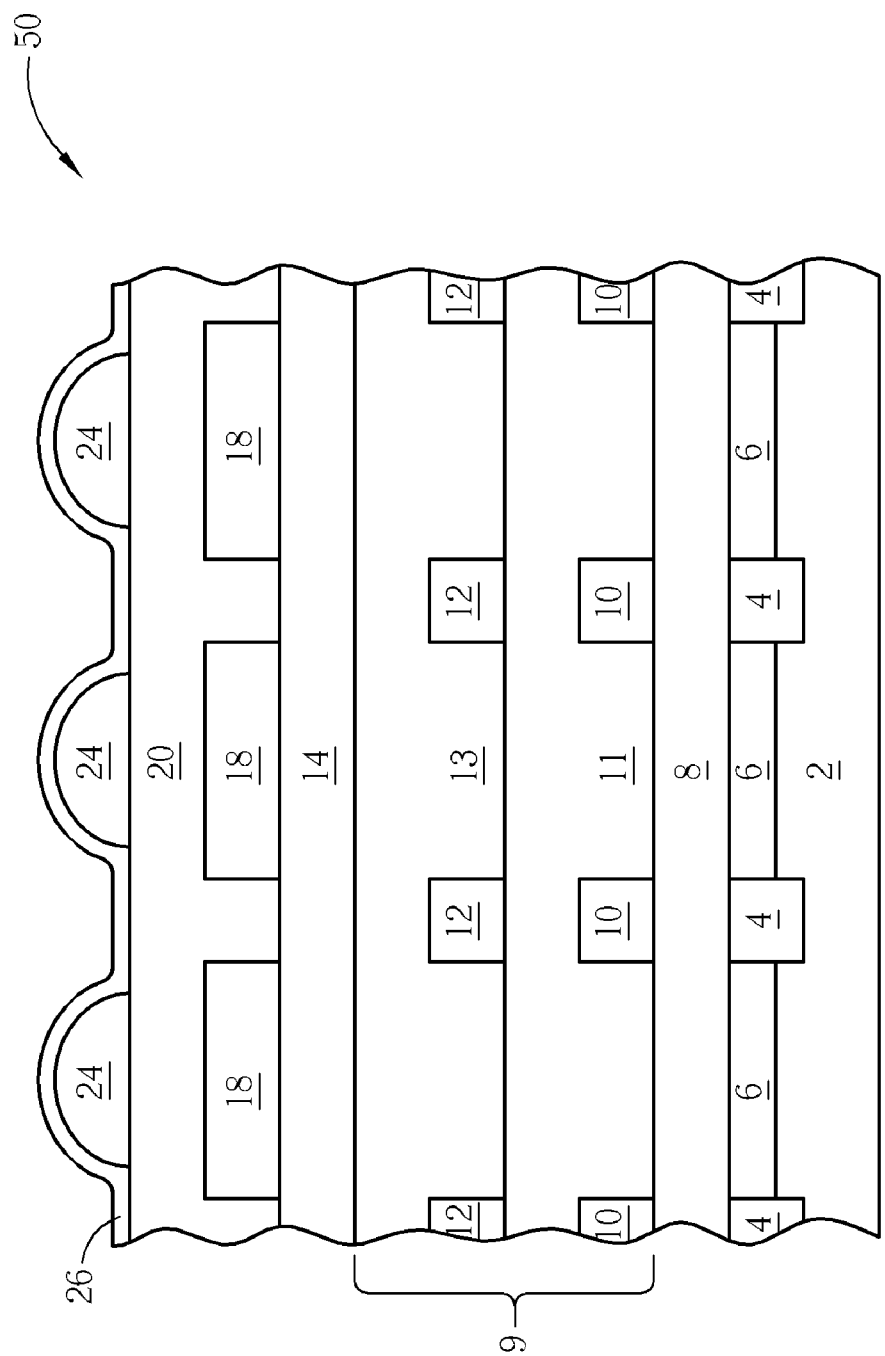
Figure 3:
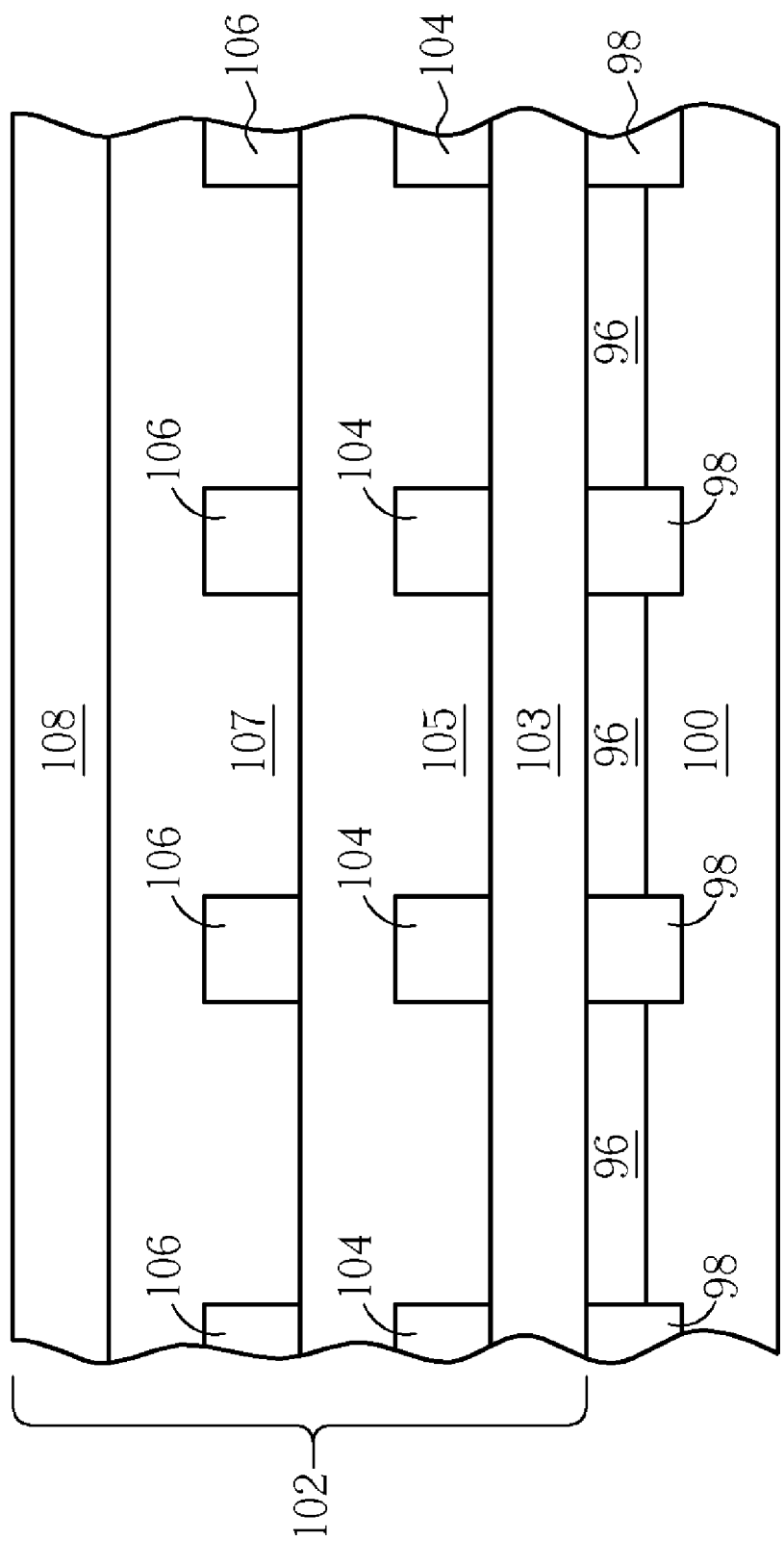
FIG. 3 to FIG. 8 shows schematic, cross-sectional diagrams illustrating a fabricating method of microlens in accordance with the first preferred embodiment of the present invention.

Please refer to FIG. 3 to FIG. 8. FIG. 3 to FIG. 8 shows schematic, cross-sectional diagrams illustrating a fabricating method of microlens in accordance with the first preferred embodiment of the present invention. As shown in FIG. 3, the present invention first provides a substrate 100 with a dielectric layer 102 thereon. The substrate 100 is a semiconductor substrate, but is not limited to a silicon wafer or a SOI, and the substrate 100 may include a plurality of light sensitization devices 96 such as photodiodes, etc., to receive the outside light beams and sensor the light intensity, and a plurality of insulators 98 such as shallow trench isolations (STIs), or local oxidation of silicon isolation layers (LOCOSs), etc., to avoid shorts and contact of the light sensitization devices 96 with MOS transistors and other devices. The light sensitization devices 96 are further electrically connected to CMOS transistors (not shown) such as reset transistors, current source followers, or row selectors. Furthermore, the dielectric layer 102 may include an inter layer dielectric (ILD) layer 103, an inter metal dielectric (IMD) layer 105, a planarized layer 107, and a passivation layer 108 such as silicon nitride, etc. A plurality of metal layers 104 and metal layers 106 of multi-level interconnects layer are formed between the IMD layer 105 and the planarized layer 107 as circuit connections of the light sensitization devices 96, MOS transistors, and other devices. The metal layers 104 and the metal layers 106 are formed above every STI for preventing each light sensitization devices 96 from covering. The incident light (not shown) is gathered into the light sensitization devices 96 without cross talk caused from the scattering.

Figure 4:
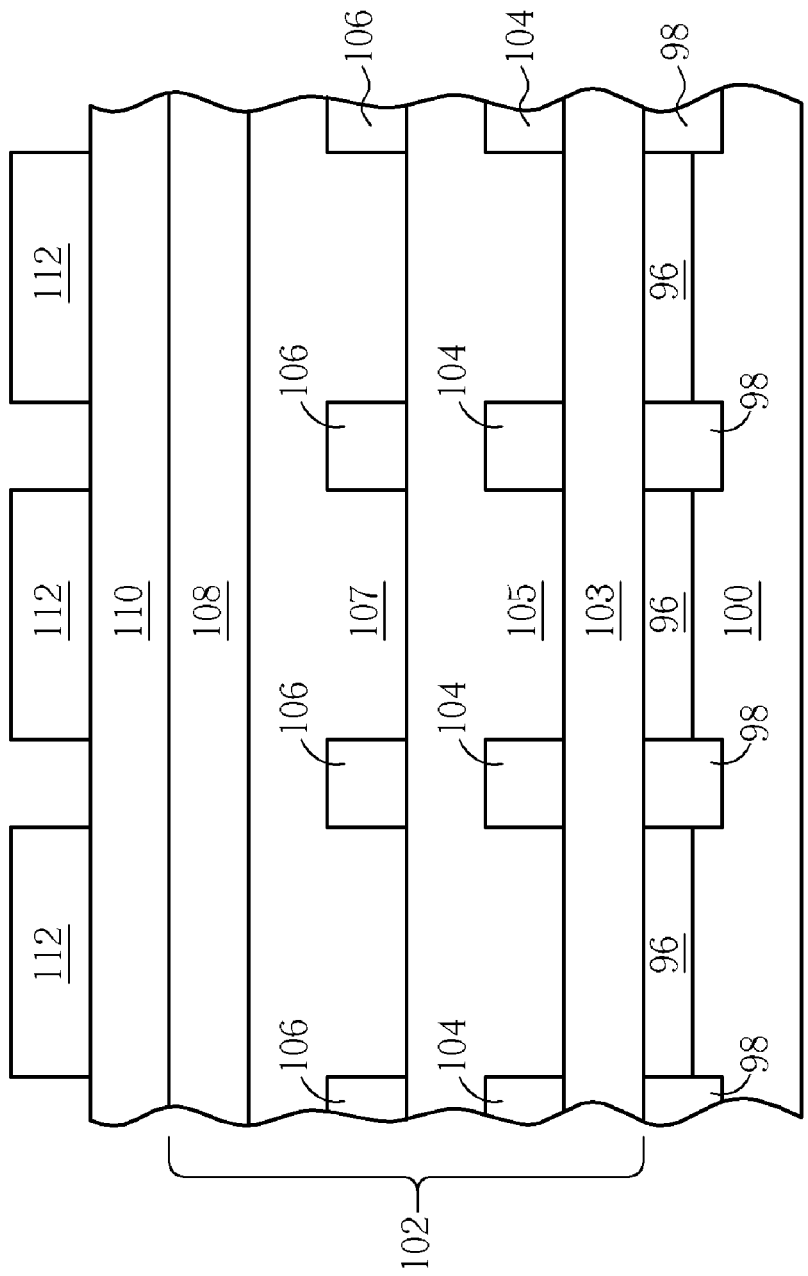
Figure 5:
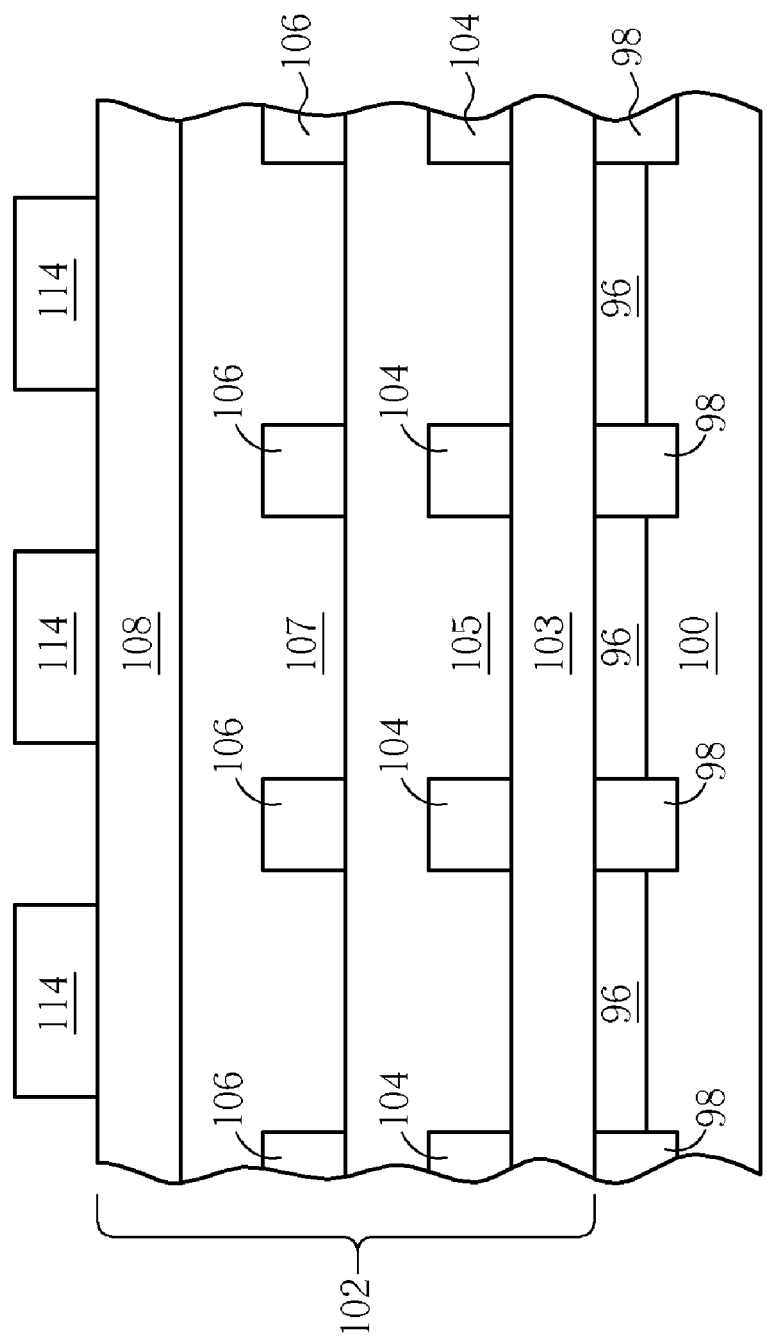
Figure 6:
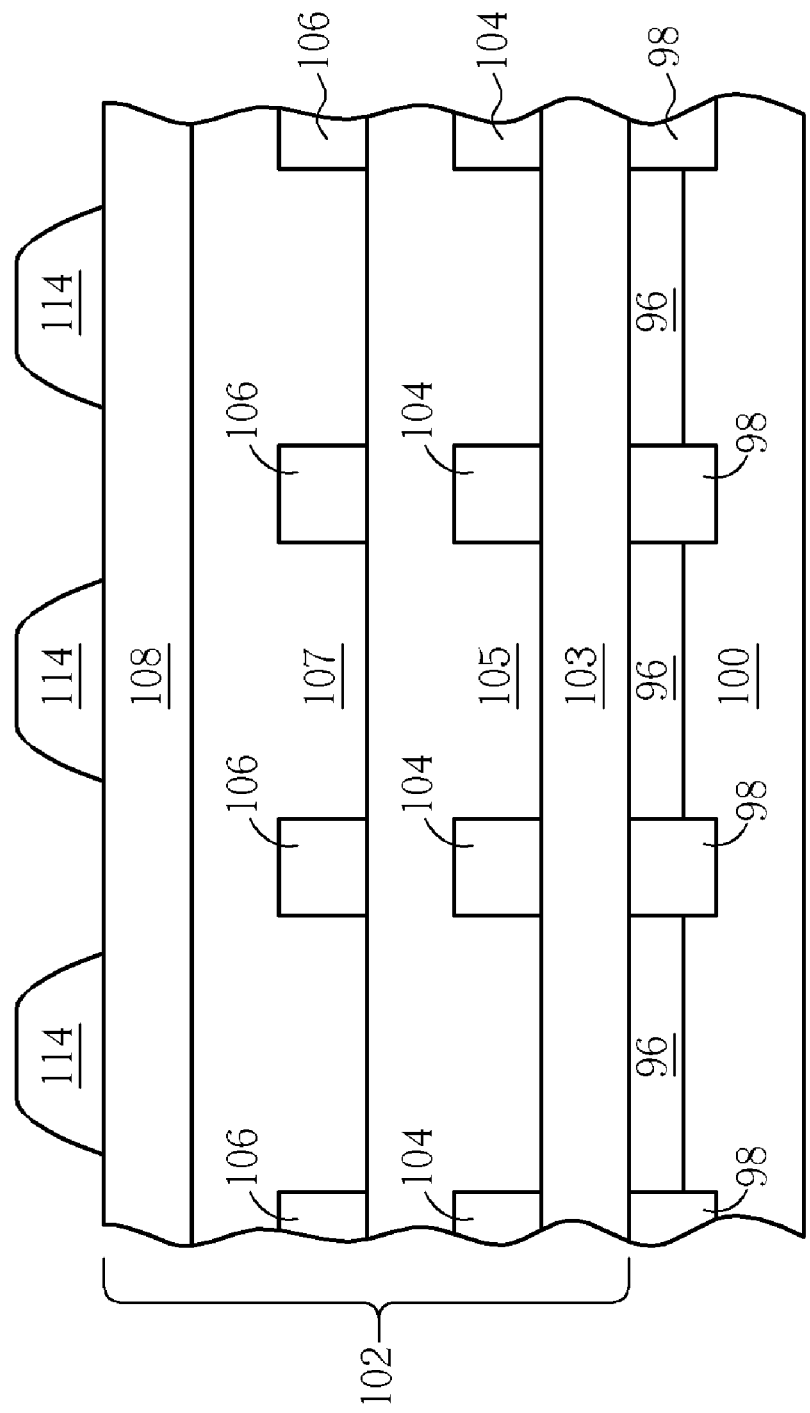

Next, as shown in FIG. 4, a deposition process is performed to form a first film 110, and then form a patterned photoresist layer 112 on the first film 110 to define positions of every microlens. The first film 110 may include an inorganic dielectric material such as Si3N4 or polyimide, etc. As shown in FIG. 5, the patterned photoresist layer 112 is used as a mask to perform an etching process such as a wet etching process or a dry etching process on the first film 110, in order to transfer the pattern of the patterned photoresist layer 112 into the first film 110 to form a plurality of micro bumps 114, and then the patterned photoresist layer 112 is removed. In the first preferred embodiment of the present invention, every micro bump 114 can be selectively etched to be a trapezoid, rectangle, or other shapes by adjusting the parameters of the exposure process, development process, and etching process for the patterned photoresist layer 112. As shown in FIG. 6, a corner rounding process such as a reflow process or an etching process can be further used to make the micro bumps 114 become trapezoids with round corners or rectangles with round corners.

Figure 7:
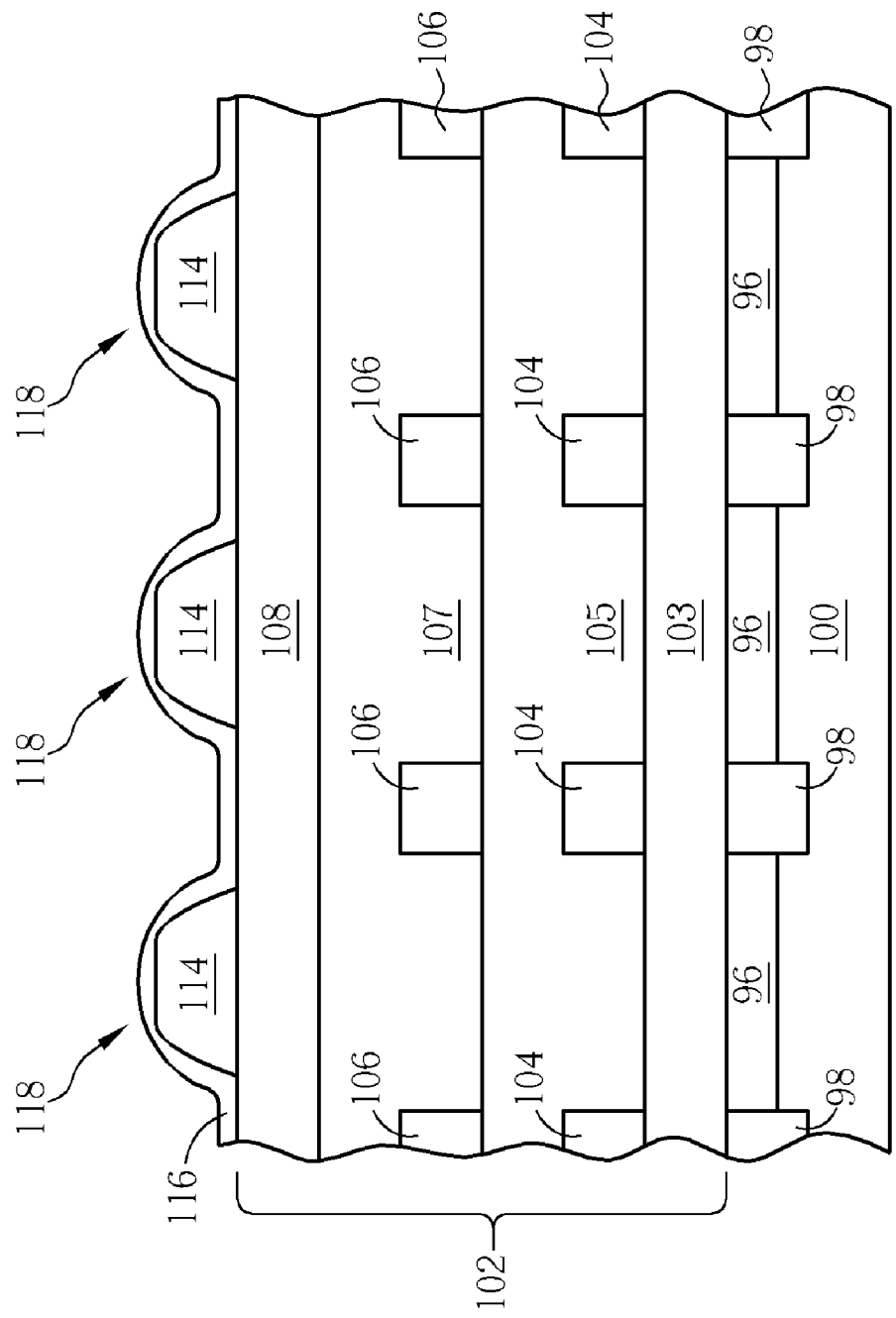
Figure 8:
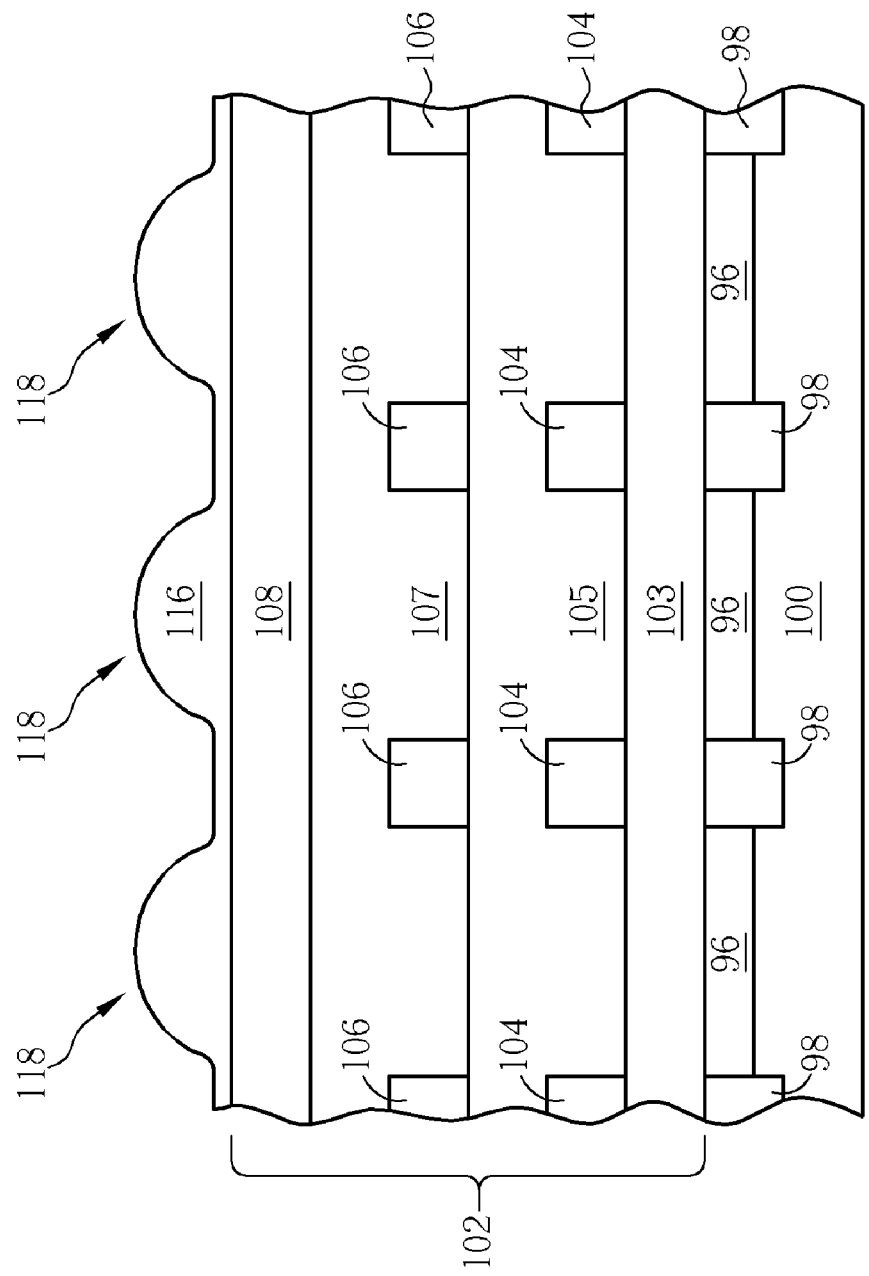

Finally, as shown in FIG. 7, a deposition process is performed to deposit a second film 116 on the dielectric layer 102 and the micro bumps 114, in order to make the micro bumps 114 covered with the second film 116 become a plurality of microlenses 118. The deposition process may be a chemical vapor deposition (CVD) process such as an atmospheric pressure chemical vapor deposition (APCVD) process, or a sub-atmospheric pressure chemical vapor deposition (SACVD) process, etc., to make the second film 116 have a smooth surface. Furthermore, the second film 116 can be the same inorganic dielectric material as the micro bump 114, a different inorganic dielectric material from the micro bump 114, or an optical film such as a dichroic film made of an inorganic dielectric material with filter function such as titanium oxide ($TiO_2$) or tantalum oxide ($Ta_2O_5$), etc.

In addition, please note that the refractive index of the micro bump 114 is greater than that of the second thin film 116 or equal to that of the second thin film 116 in a preferred embodiment. Furthermore, the present invention may optionally change thickness and width of the micro bump 114 to adjust the curvature and shape of every microlens 118, and the present invention also may optionally perform an etching back process on the second thin film 116 to adjust thickness of the second thin film 116. Moreover, the present invention also may optionally perform a thermal process to eliminate an interface between the micro bump 114 and the second thin film 116, and the temperature of the thermal process is over 250° C.

Figure 9:
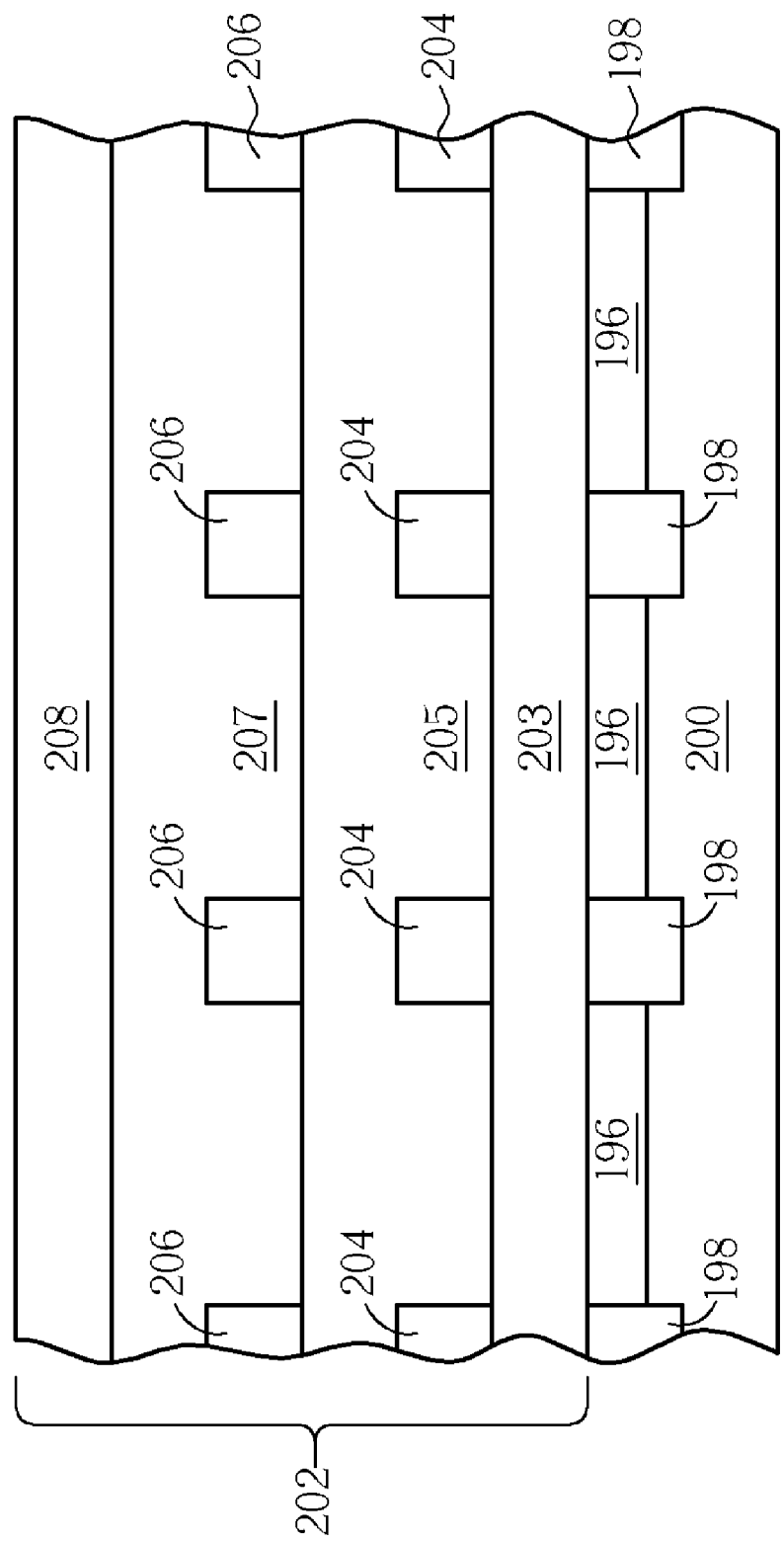
FIG. 9 to FIG. 13 shows schematic, cross-sectional diagrams illustrating a fabricating method of microlens in accordance with the second preferred embodiment of the present invention.

Please refer to FIG. 9 to FIG. 13. FIG. 9 to FIG. 13 shows schematic, cross-sectional diagrams illustrating a fabricating method of microlens in accordance with the second preferred embodiment of the present invention. As shown in FIG. 9, the present invention first provides a substrate 200 with a dielectric layer 202 thereon. Same as with the first preferred embodiment, the substrate 100 also may include a plurality of light sensitization devices 196, CMOS transistors (not shown), and a plurality of insulators 198. The dielectric layer 202 may include an ILD layer 203, a plurality of metal layers 204, an IMD layer 205, a plurality of metal layers 206, a planarized layer 207, and a passivation layer 208, etc.

Figure 10:
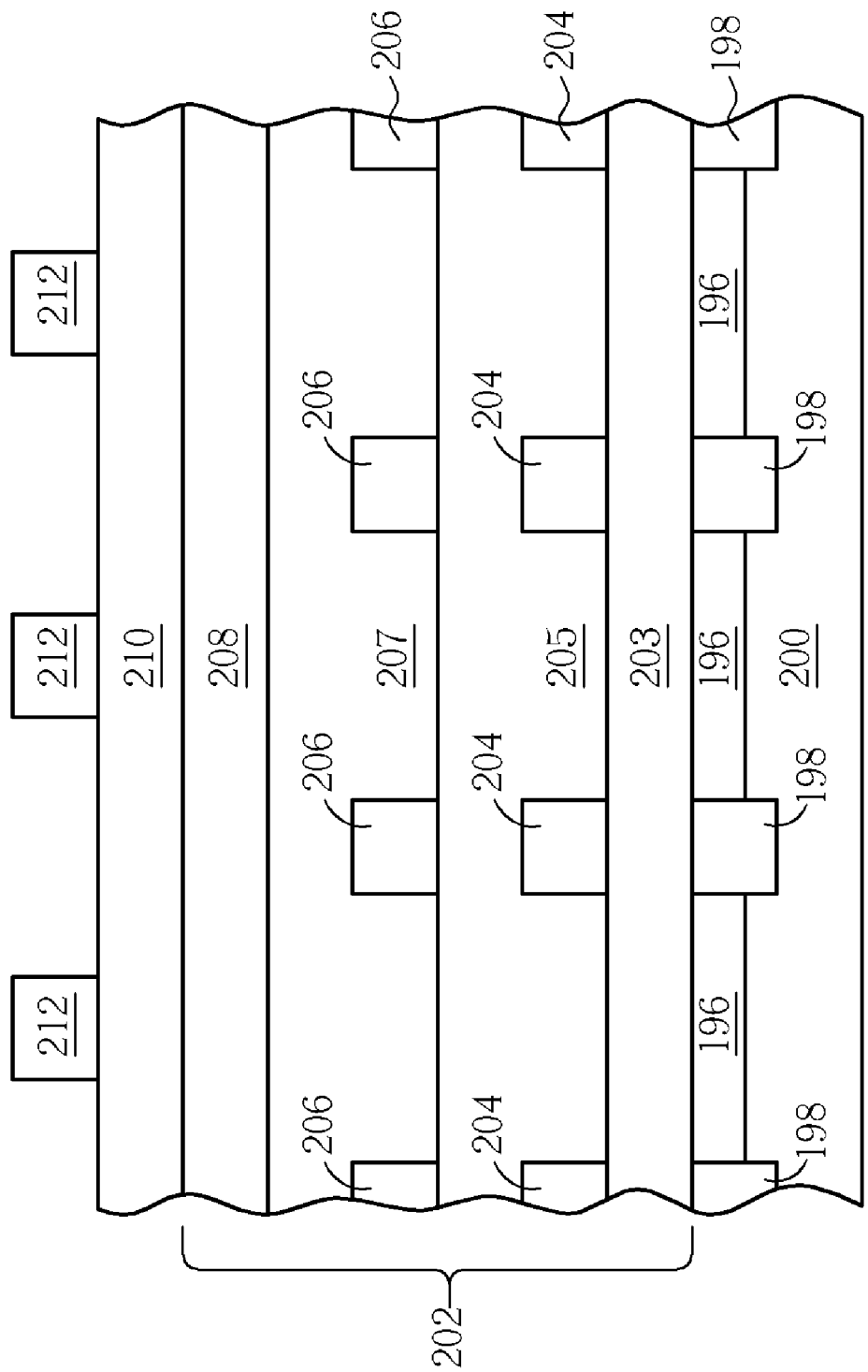
Figure 11:
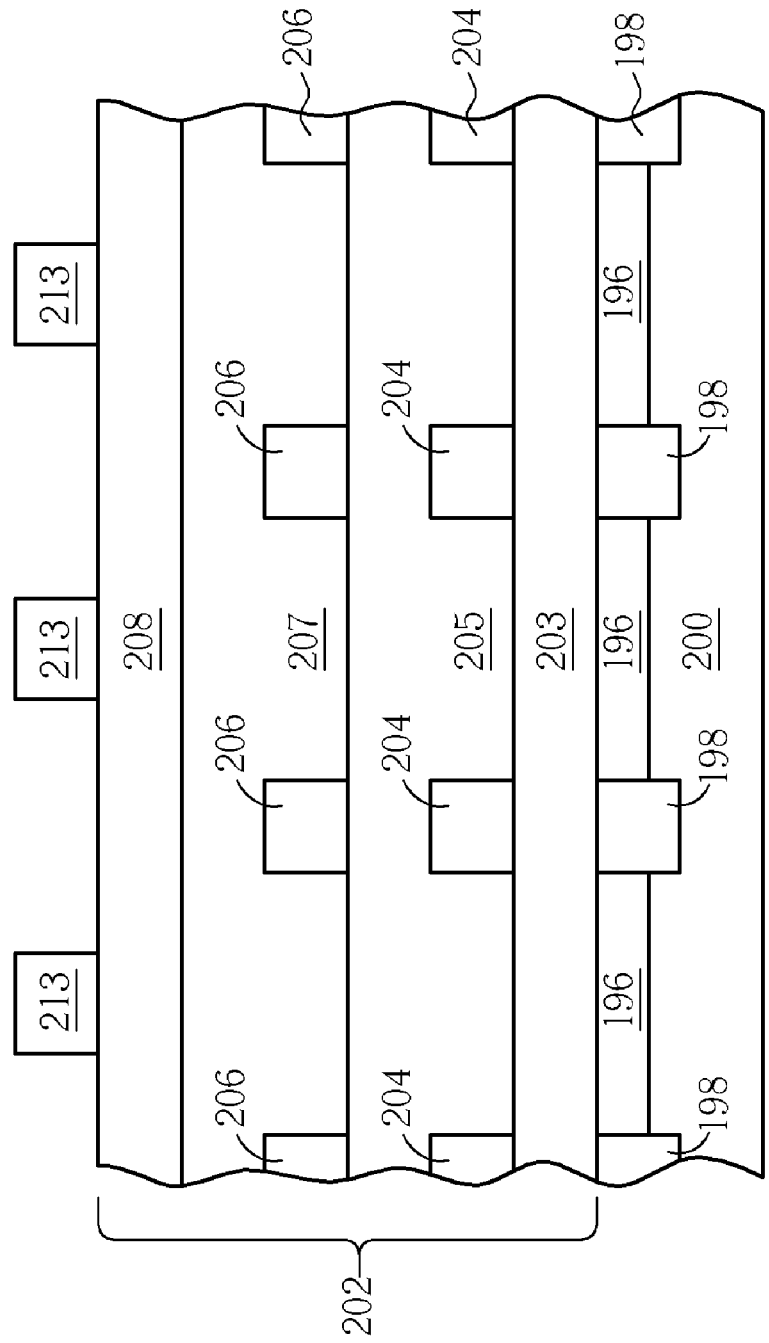

Next, as shown in FIG. 10, a deposition process is performed to form a first film 210, and then form a patterned photoresist layer 212 on the first film 210 to define positions of every microlens. The first film 210 may include an inorganic dielectric material. As shown in FIG. 11, the patterned photoresist layer 212 is used as a mask to perform an etching process on the first film 210, in order to transfer the pattern of the patterned photoresist layer 212 into the first film 210 to form a plurality of patterned first films 213 and then the patterned photoresist layer 212 is removed. The etching process may include an anisotropic dry etching process such as a sputtering etching process, plasma etching process.

Figure 12:
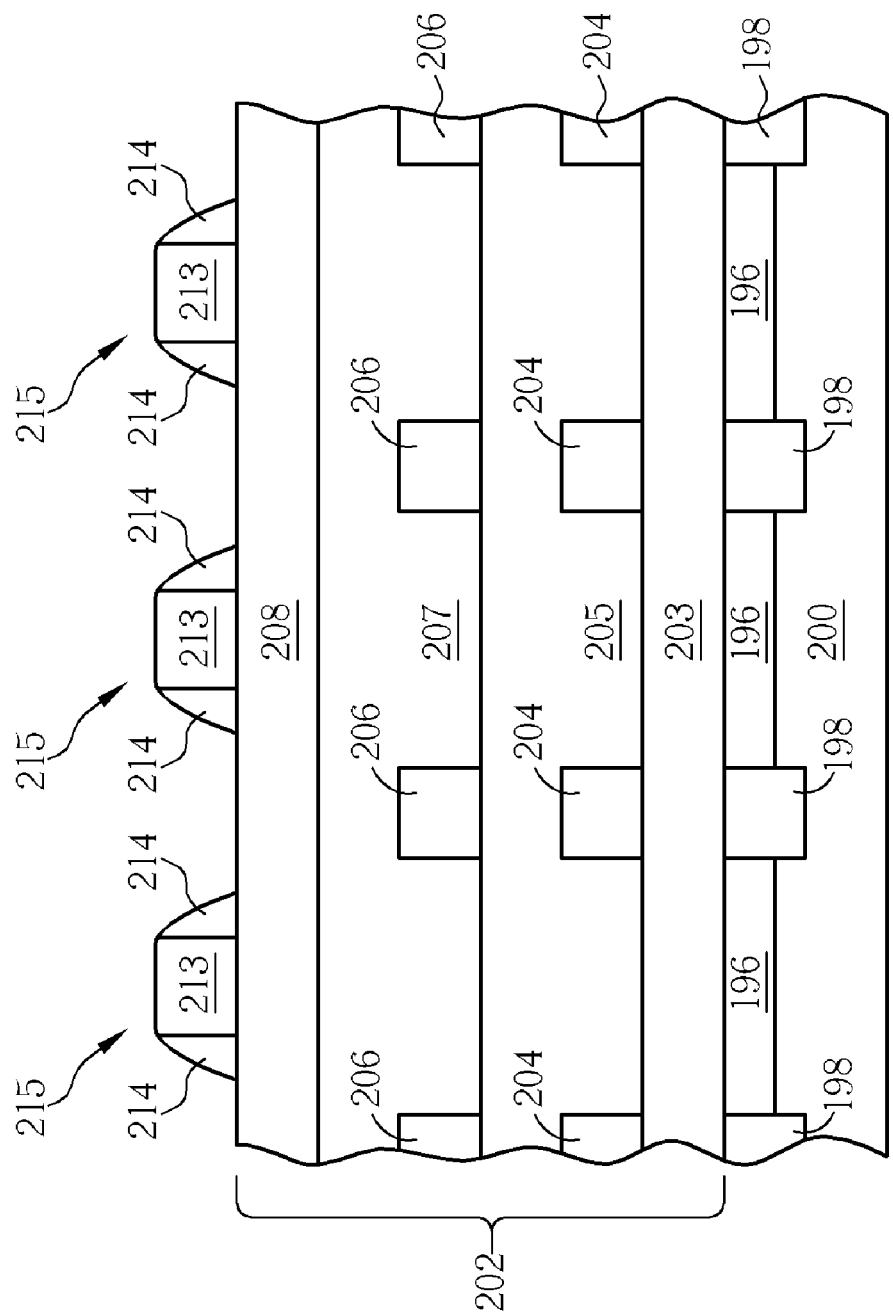

Then, as shown in FIG. 12, a deposition process and an etching back process are performed to form a spacer 214 around every patterned first film 213, and every patterned first film 213 with the spacer 214 becomes a micro bump 215 in the second preferred embodiment of the present invention, and every micro bump 215 is a trapezoid with round corners.

Figure 13:
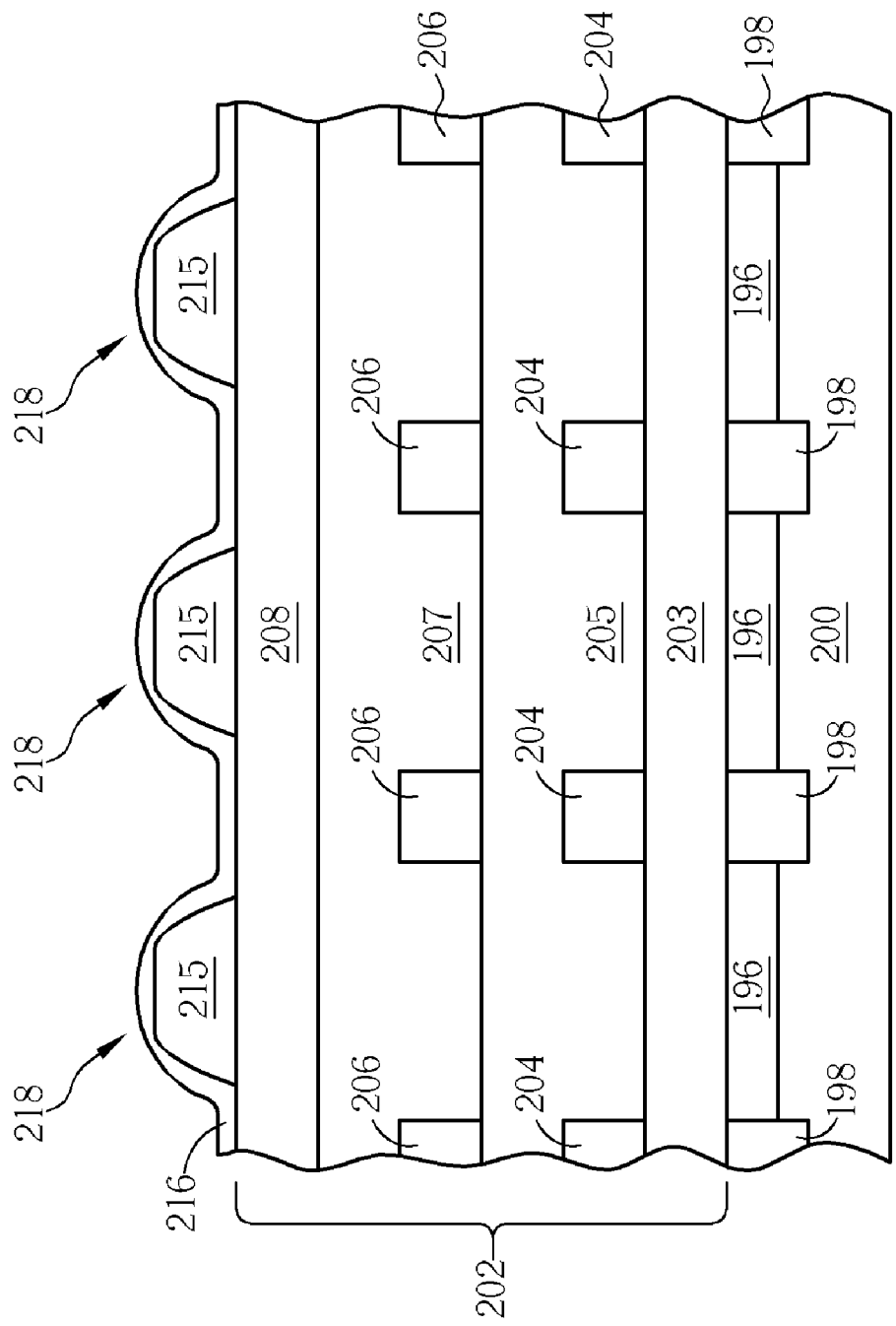

Finally, as shown in FIG. 13, a deposition process is performed to deposit a second film 216 on the dielectric layer 202 and the micro bumps 215, in order to make the micro bumps 215 covered with the second film 216 become a plurality of microlenses 218. The deposition process may be a CVD process such as an APCVD process, or a SACVD process, etc., to make the second film 216 have a smooth surface. Furthermore, the second film 216 can be the same inorganic dielectric material as the micro bump 215, a different inorganic dielectric material from the micro bump 215, or an inorganic dielectric material with filter function such as a dichroic film, etc.

In addition, please note that the refractive index of the micro bump 215 is greater than that of the second thin film 216 or equal to that of the second thin film 216 in a preferred embodiment. Furthermore, the present invention may optionally change thickness and width of the micro bump 215 to adjust the curvature and shape of every microlens 218, and the present invention also may optionally perform an etching back process on the second thin film 216 to adjust thickness of the second thin film 216. Moreover, the present invention also may optionally perform a thermal process to eliminate an interface between the micro bump 215 and the second thin film 216, and temperature of the thermal process is over 250° C.

Figure 14:
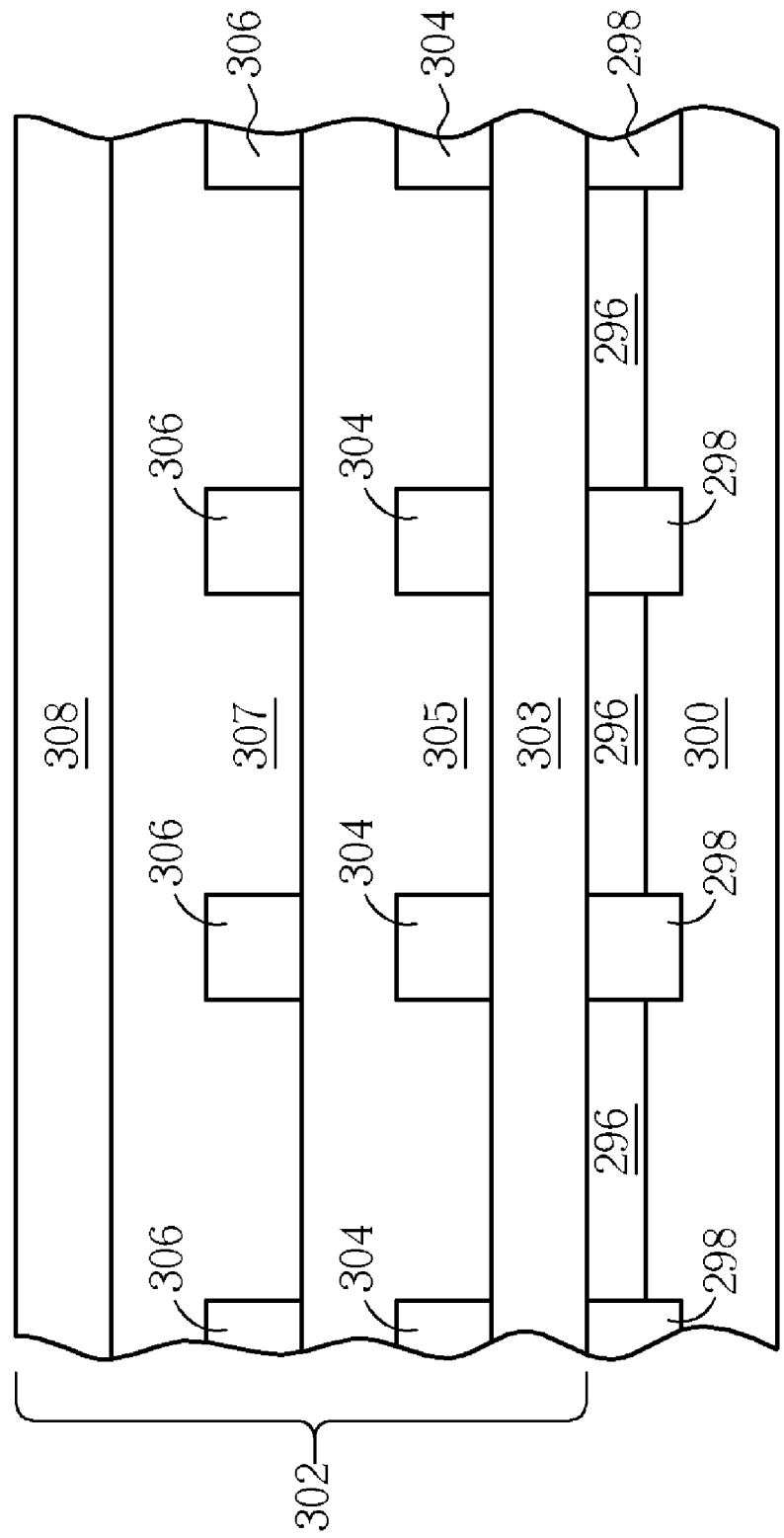
FIG. 14 to FIG. 17 shows schematic, cross-sectional diagrams illustrating a fabricating method of microlens in accordance with the third preferred embodiment of the present invention.

Please refer to FIG. 14 to FIG. 17. FIG. 14 to FIG. 17 shows schematic, cross-sectional diagrams illustrating a fabricating method of microlens in accordance with the third preferred embodiment of the present invention. As shown in FIG. 14, the present invention first provides a substrate 300 with a dielectric layer 302 thereon. Same as with the preferred embodiments mentioned above, the substrate 300 also may include a plurality of light sensitization devices 296, CMOS transistors (not shown), and a plurality of insulators 298. The dielectric layer 302 may include an ILD layer 303, a plurality of metal layers 304, an IMD layer 305, a plurality of metal layers 306, a planarized layer 307, and a passivation layer 308, etc.

Figure 15:
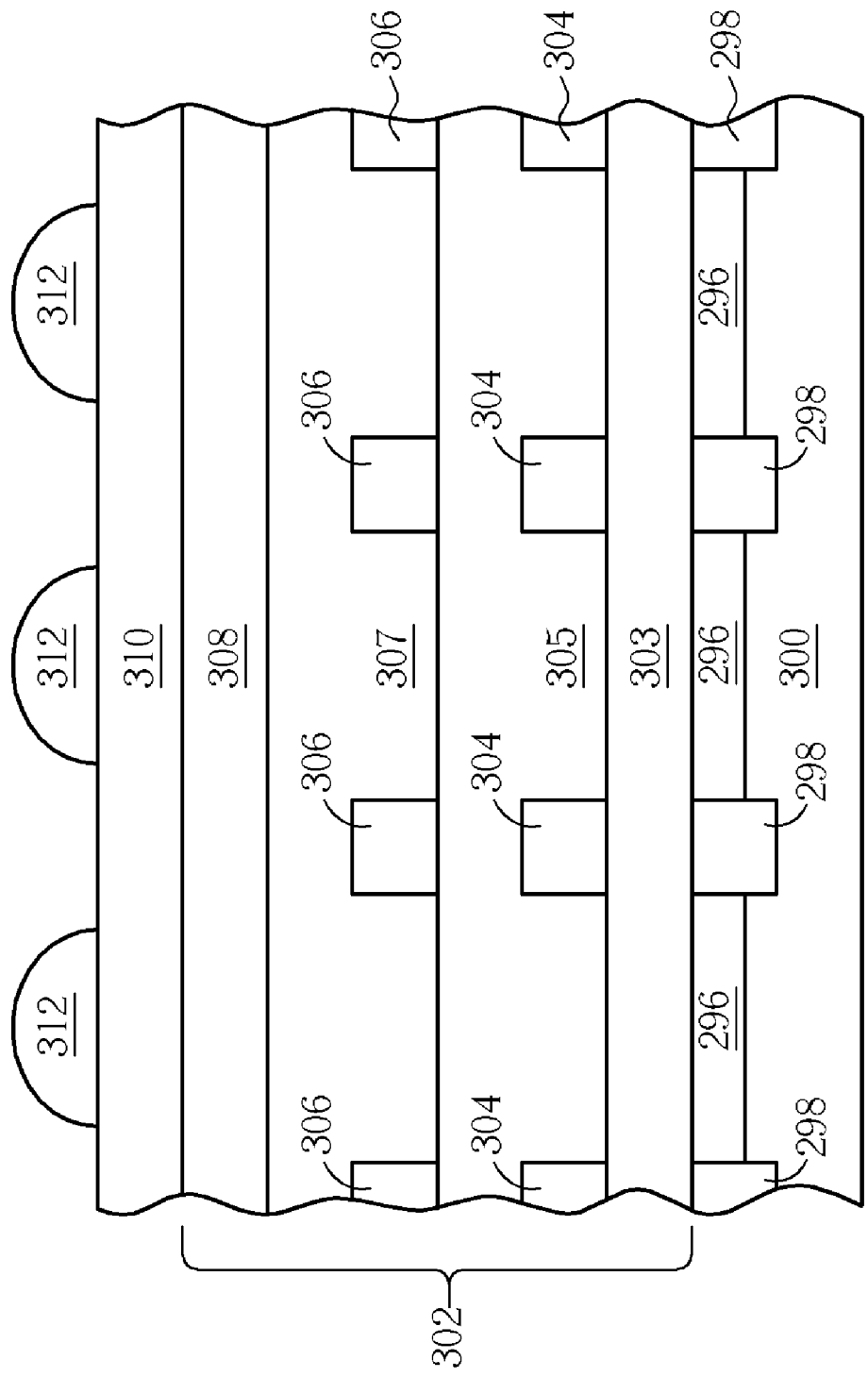

Next, as shown in FIG. 15, a deposition process is performed to form a first film 310, and then form a patterned photoresist layer 312 on the first film 310 to define positions of every microlens. The patterned photoresist layer 312 is formed by using a halftone mask, and therefore the patterned photoresist layer 312 can be semicircle, semi-ellipsoid, or ladder shaped after exposure. Furthermore, the first film 310 may include an inorganic dielectric material.

Figure 16:
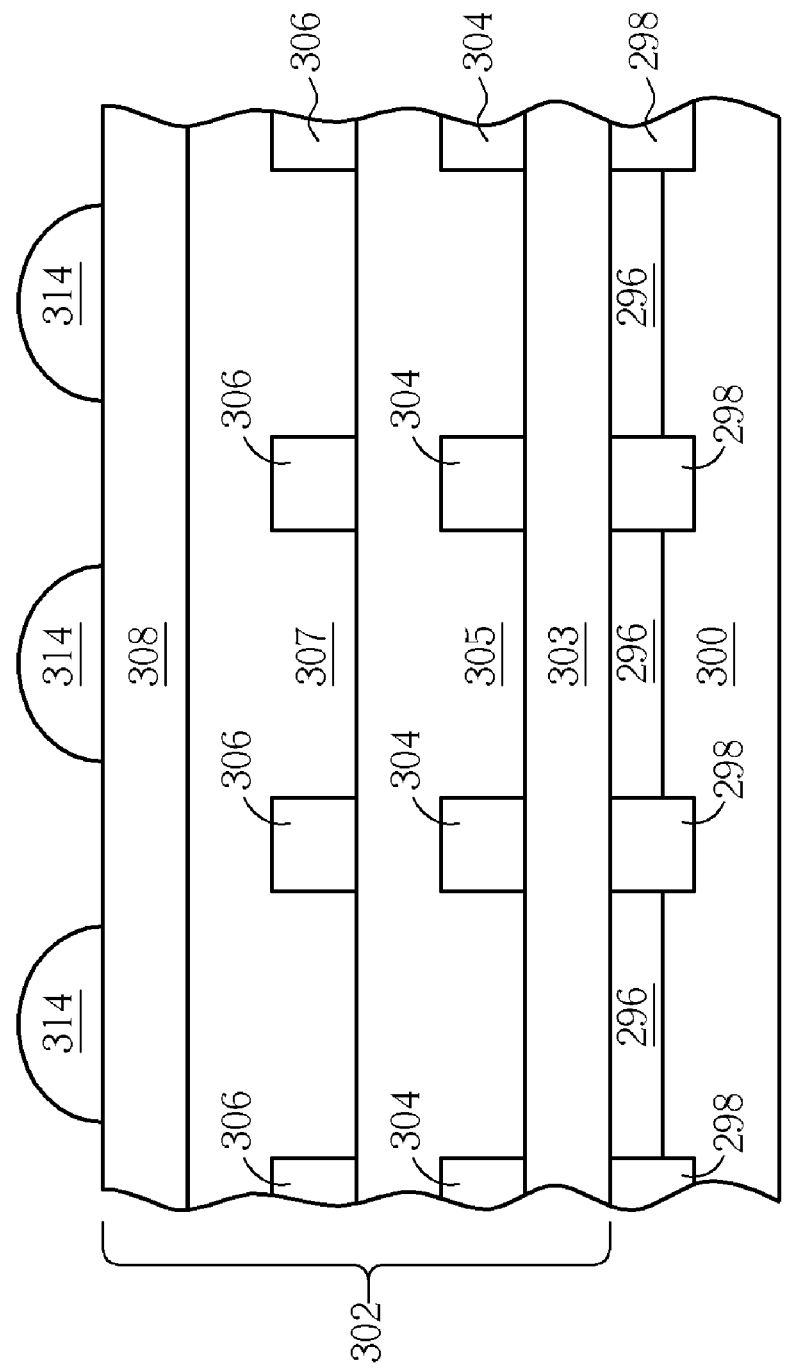

As shown in FIG. 16, the patterned photoresist layer 312 is used as a mask to perform an etching process on the first film 310, in order to transfer the pattern of the patterned photoresist layer 312 into the first film 310 to form a plurality of micro bumps 314, and then the patterned photoresist layer 312 is removed. The etching process may include an anisotropic dry etching process such as a sputtering etching process, plasma etching process, or RIE process, etc.

Figure 17:
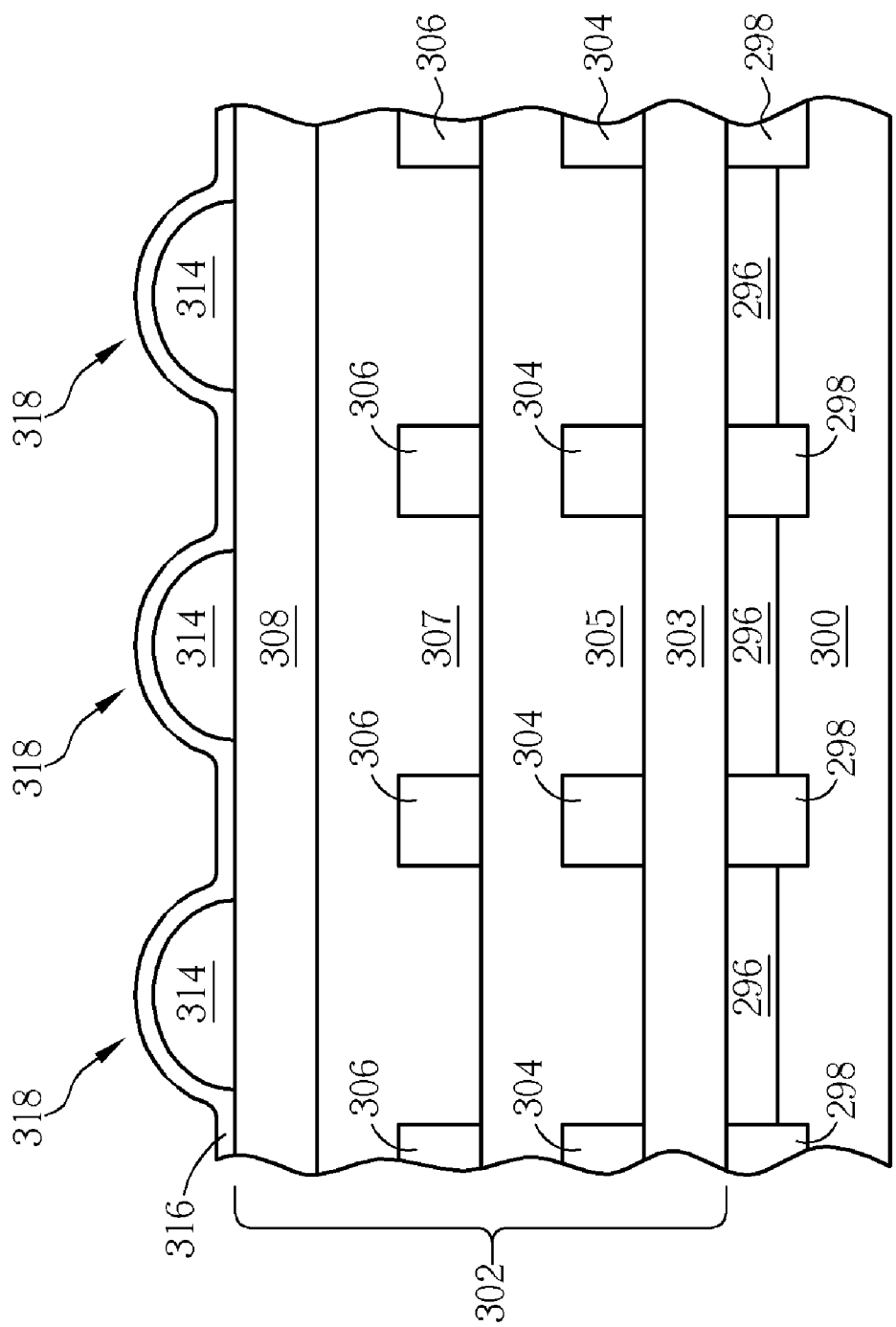

Finally, as shown in FIG. 17, a deposition process is performed to deposit a second film 316 on the dielectric layer 302 and the micro bumps 314, in order to make the micro bumps 314 covered with the second film 316 become a plurality of microlenses 318. The deposition process may be a CVD process such as an APCVD process, or a SACVD process, etc., to make the second film 316 have a smooth surface. Furthermore, the second film 316 can be the same inorganic dielectric material as the micro bump 314, a different inorganic dielectric material from the micro bump 314, or an inorganic dielectric material with filter function such as a dichroic film, etc.

In addition, please note that the refractive index of the micro bump 314 is greater than that of the second thin film 316 or equal to that of the second thin film 316 in a preferred embodiment. Furthermore, the present invention may optionally change thickness and width of the micro bump 314 to adjust the curvature and shape of every microlens 318, and the present invention also may optionally perform an etching back process on the second thin film 316 to adjust thickness of the second thin film 316. Moreover, the present invention also may optionally perform a thermal process to eliminate an interface between the micro bump 314 and the second thin film 316, and temperature of the thermal process is over 250° C.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of fabricating a microlens, comprising:
providing a substrate with at least a dielectric layer thereon;
forming a first thin film on the dielectric layer surface;
etching the first thin film to form at least a micro bump; and
forming a second thin film fully covering the micro bump surface and dielectric layer surface, wherein the micro bump and the second thin film fully covering the micro bump surface and the dielectric layer surface form the microlens.

2. The method of claim 1 wherein the substrate has at least a light sensitization device.

3. The method of claim 1 wherein the method of etching the first thin film to form the micro bump further comprises:
forming a patterned photoresist layer on the first thin film;
using the patterned photoresist layer as a mask to etch the first thin film to form the micro bump; and
removing the patterned photoresist layer.

4. The method of claim 3 wherein after removing the patterned photoresist layer, the method further comprises performing a corner rounding process on the micro bump.

5. The method of claim 4 wherein the corner rounding process comprises a reflow process or an etching process.

6. The method of claim 1 further comprising a step of etching back the second thin film.

7. The method of claim 1 wherein the refractive index of the micro bump is greater than that of the second thin film or equal to that of the second thin film.

8. The method of claim 1 wherein the micro bump and the second thin film are the same dielectric material.

9. The method of claim 8 wherein the dielectric material comprises inorganic dielectric materials.

10. The method of claim 1 wherein the second thin film comprises a color filter material or a dichroic film.

11. The method of claim 1 wherein the shape of the micro bump is a semicircle, rectangle, trapezoid, rectangle with round corners, or trapezoid with round corners.

12. The method of claim 1 further comprising performing a thermal process with temperature over 250° C. to eliminate an interface between the micro bump and the second thin film.

13. A method of fabricating a microlens, comprising:
providing a substrate with at least a dielectric layer thereon;
forming a first thin film on the dielectric layer surface;
etching the first thin film to form a patterned first thin film;
forming a spacer around the patterned first thin film, the patterned first thin film and the spacer together forming a micro bump; and
forming a second thin film on the micro bump surface and dielectric layer surface, wherein the second thin film and the micro bump form the microlens.

14. The method of claim 13 wherein the substrate has at least a light sensitization device.

15. The method of claim 13 wherein the method of etching the first thin film to form the micro bump further comprises:
forming a patterned photoresist layer on the first thin film;
using the patterned photoresist layer as a mask to etch the first thin film to form the patterned first thin film; and
removing the patterned photoresist layer.

16. The method of claim 13 further comprising a step of etching back the second thin film.

17. The method of claim 13 wherein the refractive index of the micro bump is greater than that of the second thin film or equal to that of the second thin film.

18. The method of claim 13 wherein the micro bump and the second thin film are the same dielectric material.

19. The method of claim 18 wherein the dielectric material comprises inorganic dielectric materials.

20. The method of claim 13 wherein the second thin film comprises a color filter material or a dichroic film.

21. The method of claim 13 further comprising performing a thermal process with temperature over 250° C. to eliminate an interface between the micro bump and the second thin film.

* * * * *